United States Patent [19]

Triolo

[11] Patent Number: 5,686,501
[45] Date of Patent: Nov. 11, 1997

[54] BREATHABLE OPEN CELL URETHANE POLYMERS

[75] Inventor: Rocco P. Triolo, Broomall, Pa.

[73] Assignee: Foamex L.P., Linwood, Pa.

[21] Appl. No.: 634,885

[22] Filed: Apr. 19, 1996

[51] Int. Cl.$^6$ ................................................. C08G 18/34
[52] U.S. Cl. ............................ 521/130; 521/137; 521/174
[58] Field of Search ...................................... 521/130, 137, 521/174

[56] References Cited

U.S. PATENT DOCUMENTS

| | | | |
|---|---|---|---|
| 3,884,848 | 5/1975 | Ricciardi et al. | 521/173 |
| 4,052,346 | 10/1977 | Rudner et al. | 521/130 |
| 4,503,150 | 3/1985 | Triolo . | |
| 4,608,418 | 8/1986 | Czerwinski et al. | 521/130 |
| 4,777,186 | 10/1988 | Stang et al. . | |
| 4,826,882 | 5/1989 | Bredbenner et al. | 521/172 |

FOREIGN PATENT DOCUMENTS

WO 93/09934  5/1993  WIPO .

*Primary Examiner*—Morton Foelak
*Attorney, Agent, or Firm*—Connolly & Hutz

[57] ABSTRACT

A breathable or air-permeable, open cell, flexible urethane polymer suitable for use in cushions is formed from a foam-forming composition containing from about 0.5 to 2.0 parts by weight of butyl oleate, based upon 100 parts by weight polyol, under controlled pressure conditions maintained at or, preferably, below atmospheric pressure. The pressure during foaming is maintained in the range of about 0.5 to 1.0 bar, preferably 0.5 to 0.9 bar. Resultant air permeability is unexpectedly significantly increased over urethane polymers of equivalent composition. Other polymer properties are enhanced.

12 Claims, No Drawings

BREATHABLE OPEN CELL URETHANE POLYMERS

BACKGROUND OF THE INVENTION

This invention relates to breathable or air-permeable, open cell, flexible urethane polymers.

Polyurethane foams produced by the reaction of a polyether polyol with an isocyanate usually in the presence of a catalyst, surfactant and blowing agent are known generally as polyether based polyurethane foams. Suitable reactants for producing polyurethane foams are known to those of skill in the art. Methods of producing polyether-based polyurethane foams with flexible, semi-rigid or rigid properties are disclosed in U.S. Pat. No. 3,194,773, issued Jul. 13, 1965 to Hostettler. Other patents that generally teach the characteristics of polyether polyols, isocyanates and other reactants for making polyurethane foams include U.S. Pat. No. 3,383,351 to Stamberger (polymer polyols) and U.S. Pat. No. 3,454,505 to Cross, et al. (polyether polyols).

For many cushioning applications, such as mattresses, mattress pads, medical pads and furniture cushions, a flexible urethane with certain density, softness, rebound, compression set, internal force deflection (IFD), fire retardance and air permeability is desired. To produce a polymer structure the required density and IFD, the formulator may sacrifice compression set and other properties. Polymer structures formed under vacuum conditions generally have lower densities and greater softness than polymers of equivalent composition formed at or above atmospheric pressure.

Processes for producing polyurethane foams under variable pressure conditions have been disclosed. PCT Published Patent Application WO 93/09934 discloses methods for continuously producing slabs of urethane polymers under controlled pressure conditions, including vacuum conditions (below atmospheric pressure). The foam-forming mixture of polyisocyanate, polyol, blowing agent and optional additives is introduced substantially continuously onto a moving conveyor in a substantially closed chamber. The foaming takes place in the substantially closed chamber at controlled pressure and temperature. Reaction gases are vented or exhausted from the chamber to maintain the chamber pressure at or below atmospheric or ambient pressure. As the foam rises, it is conveyed toward a chamber exit. The exit is opened at intervals to cut and remove sections of the foam slab.

Foaming may be conducted under vacuum conditions in batch processes as well. For example, U.S. Pat. No. 4,503,150 to Triolo at col. 10, lines 3 to 14 describes allowing a single batch foam-forming mixture to expand in a closed mold with internal pressure maintained at a vacuum.

Controlling foam forming under reduced pressures can be more difficult, however. The polymer structure does not always and repeatedly form structures with open cells. Sometimes the polymer structure shrinks upon cooling due to an insufficient number of open cells. Such tight cell structures are unsuitable for cushioning applications due to poor recovery and durability. A more open, breathable cell structure is preferred for bedding and cushioning applications because such structures permit increased air circulation and are more comfortable. In addition, foams are typically compressed when they are packaged for shipment to customers. Foams with tight cell structures do not recover in a suitable manner.

SUMMARY OF THE INVENTION

Methods and compositions for forming a breathable or air-permeable, open cell, flexible urethane polymer structure under controlled pressures maintained at or below atmospheric pressure, preferably in the range of 0.5 to 1.0 bar, most preferably 0.5 to 0.9 bar, are disclosed. The invention comprises reacting a polyether polyol, or mixture of a polyether polyol with a polymer polyol, with a polyisocyanate, such as toluene diisocyanate or other polyisocyanates or mixtures of polyisocyanates in the presence of a blowing agent, such as water, and from about 0.5 to 2.0 parts, preferably 1.0 to 1.5 parts, based on 100 parts by weight polyol, of butyl oleate. The isocyanate index preferably will be within the range of 100 to 120, most preferably 107 to 115 to obtain desired compression set values.

The polyisocyanate is reacted with the polyol in the presence of the blowing agent in an apparatus in which the pressure is controlled or maintained at or below atmospheric pressure. The foam is allowed to rise under the controlled pressure conditions. Thereafter, the foam should be cured for at least one hour and up to twenty-four (24) hours at ambient pressure and temperature before foam properties are determined.

Optionally, other foam-forming additives may be present in the foam-forming composition, such as fire retardants, melamine, catalysts, surfactants, extenders, colorants, pigments, deodorants, antimicrobial compounds, and the like. Such optional additives may be included so long as they do not adversely affect the resultant air permeability and density of the polymer structure.

The open cell, flexible urethane polymer structures formed under controlled pressure conditions from the compositions including butyl oleate surprisingly have resultant air permeability much greater than polymer structures produced under the identical conditions and with the identical compositions, except lacking butyl oleate. Air permeability for all polymer structures so formed with the butyl oleate remained greater than about 110 $ft^3/ft^2/min$. The polymer structures have desired density, softness, rebound and compression set properties making them well suited for use as cushions.

DESCRIPTION OF THE PREFERRED EMBODIMENTS

The air-permeable or breathable, open cell, flexible urethane polymer according to the invention is formed from the reaction of a polyol and a polyisocyanate in the presence of a blowing agent. The foam-forming composition additionally contains from 0.5 to 2.0 parts by weight, preferably 1.0 to 1.5 parts, based on 100 parts by weight polyol, of butyl oleate.

Polyether polyols having a functionality of at least 2.0 are known to be suitable for producing flexible polyurethane foams. Conventional polyols may be used in this invention. The polyether polyols and/or graft polyols used in the present invention have an average molecular weight of about 3000 to 3500. Examples of these polyols are VORANOL 3010 from Dow Chemical and PLURACOL 1103 from BASF.

The term "polyether polyol" includes linear and branched polyethers (having ether linkages) and containing at least two hydroxyl groups and includes polyoxypropylene polyether polyol or mixed poly(oxyethylene/oxypropylene) polyether polyol. Preferred polyethers are the polyoxyalkylene polyols, particularly the linear and branched poly(oxethylene) glycols, poly(oxypropylene) glycols and their copolymers. Modified polyether polyols are those polyether polyols having a polymer of ethylenically unsaturated monomers dispersed therein. Representative modified polyether polyols include polyoxypropylene polyether polyol into which is dispersed poly(styrene acrylonitrile) or polyurea, and poly(oxyethylene/oxypropylene) polyether polyols into which is dispersed poly(styrene acrylonitrile) or polyurea. Modified polyether polyols are commercially available from several companies, including Arco (supplied as "Polymer Polyol"), BASF (supplied as "Graft Polyol"), Dow Chemical (supplied as "Co-polymer Polyol") and Mobay (supplied as "PHD Polyol"). Arco, BASF and Dow Chemical disperse poly(styrene acrylonitrile) into the polyol, whereas Mobay disperses polyurea therein. Some examples of commercially available modified polyether polyols are set forth below:

| Polyether Polyol | Type |
| --- | --- |
| ARCO "Polymer Polyols" | HS100 Niax E694 |
| BASF "Graft Polyols" | PLURACOL 1103 PLURACOL 994LV |
| DOW "Copolymer Polyols" | VORANOL 3939 VORANOL 3943 |
| MOBAY "PHD Polyols" | E9232 |

Modified polyether polyols can be prepared by the procedure described by Critchfield, et al, *Rubber Chemistry and Technology*, Vol. 45, No. 5, pp. 1467–77 (1972) and U.S. Reissue Pat. No. 23,817, which teaches reacting polyether polyol (e.g., polyoxypropylene polyol) with styrene and acrylonitrile in the presence of a free radical catalyst, then isolating the resulting modified polyether.

The term polyisocyanate refers particularly to isocyanates that have previously been suggested for use in preparing polyurethane foams. "Polyisocyanates" include di- and polyisocyanates and prepolymers of polyols and polyisocyanates having excess isocyanate groups available to react with additional polyol.

The amount of polyisocyanate employed is frequently expressed by the term "index" which refers to the ratio of the actual amount of isocyanate in the reaction mixture to the theoretical amount of isocyanate required for reaction with all the active hydrogen-containing compounds present in the reaction mixture multiplied by 100. For most applications, the index is in the range of from about 70 to 150, preferably from about 90 to 130, most preferably from about 110 to 120.

Conventional polyisocyanates may be used in this invention. Suitable polyisocyanates are toluene diisocyanate (TDI) other polyisocyanates, particularly including TD80, a commercially available TDI. The polyisocyanates should be present in an amount of about 40 to 70 parts by weight, preferably 50 to 70 parts by weight, based on 100 parts by weight polyol in the foam-forming composition.

Blowing agents which may be employed include, for example, water, either alone or admixed with other components, e.g., as an aqueous solution of catalysts. When water is employed it reacts with an excess of the polyisocyanates to generate carbon dioxide, thereby resulting in a foam. Carboxyl-containing compounds may also be included as a source of carbon dioxide. The blowing agent should be present in an amount of about 2 to 6 parts by weight, preferably 2 to 3 parts by weight, based on 100 parts by weight, polyol in the foam-forming composition.

Catalysts may be used to accelerate the polyol-polyisocyanate reaction. The catalyst may be either a single compound or a mixture of two or more compounds from, for example, amines and metal salts. Especially preferred catalysts are organotin salts and tertiary amines. The amount of catalyst employed may be varied over a wide range, depending upon the formulation employed and the type of catalyst, as is known to those skilled in the art. For most applications, the catalyst, either as a single compound or as a mixture of compounds, is employed in an amount equal to from about 0.01 to 5.0 parts by weight per 100 parts by weight of polyol in the foam-forming compositions.

When blowing agents are included in or generated by the polyurethane reactants, surfactant-type stabilizers are frequently included in the foam-forming composition. The surfactants control the amount and quality of the foamed polyurethane obtained.

Optionally, other additives may be added to the foam-forming composition. Usually, the additives will be pre-mixed with the polyol. The optional additives include, but are not limited to, fire retardants, melamine, surfactants, antimicrobial compounds, colorants, pigments, extenders, deodorants, stabilizers. Such additives must not have any deleterious effect on the air permeability of the resultant urethane.

The foam-forming process may be carried out batchwise, semi-continuously or continuously, so long as pressure may be controlled and maintained at or below ambient pressure. The desired product air permeability, density, softness and compression characteristics are most readily obtained when foam-forming is carried out at vacuum conditions. Any foam-forming apparatus that permits one to control and maintain the pressure at or below atmospheric pressure during foam-forming is suitable for this invention. The pressure or vacuum preferably will be maintained in the range of about 0.5 to 1.0 bar, most preferably about 0.5 to 0.9 bar. For example, in a batch process a polyurethane foaming mixture may be placed into a closed chamber maintained at or below atmospheric pressure. While the reaction is allowed to take place, the emitted gases are vented from the chamber to maintain the vacuum condition throughout the foaming reaction. Alternatively, this method may be made continuous. The foaming mixture is added to the pressure controlled chamber continuously and the chamber is vented to a constant pressure (vacuum) during the continuous foaming reaction. The foam formed may be conveyed out of the chamber. An apparatus for continuously producing polyurethane foam under controlled pressures is disclosed in published PCT patent application WO 93/09934.

The invention is further illustrated, but not limited by, the following examples.

EXAMPLES

Foam-forming compositions were made on a laboratory scale as hand mixes with the components and in the amounts shown in Table I. The ingredients, except water and isocyanate, were pre-mixed with the polyol. The water, isocyanate and pre-mixed polyol and other ingredients were then mixed together in a hand mixer and introduced into a box with a controlled pressure or vacuum. The polymer was allowed to rise in the box for ten (10) minutes. After the polymer had risen to full rise, the polymer was removed from the box and allowed to cure for one (1) hour.

Physical characteristics of the resultant polymer were then measured and reported. Air permeability was determined in cubic feet per square foot per minute of a sample using a Frazier Differential Pressure Air Permeability Pressure Machine in accord with ASTM D 737. In summary, the pressure drop across a polymer sample is measured while a set rate of air flow is administered to one surface of the sample. Air permeability is defined as the rate of air flow through a material under a differential pressure between the two surfaces of the sample material. A higher air permeability at a given density is desired for foam polymer cushions because such cushions will provide more air circulation and greater comfort.

Ball Rebound is a measure of the percent of polymer height return after a standard weight is dropped onto the polymer sample from a standard height above the sample. The test was performed according to ASTM 357 testing standards. The rebound height of the sample is measured while the weight remains on the sample. A higher Ball Rebound indicates a greater springiness and load support. A higher number indicates a better result for a cushion.

TABLE 1

| EXAMPLE | C1 | 1 | C2 | 2 |
|---|---|---|---|---|
| Polyol (3010) | 100.0 | 100.0 | 100.0 | 100.0 |
| H$_2$O | 5.0 | 5.0 | 5.0 | 5.0 |
| L620[1] | 2.0 | 2.0 | 2.0 | 2.0 |
| C2[2] | 0.27 | 0.27 | 0.27 | 0.27 |
| R8020[3] | 0.18 | 0.18 | 0.18 | 0.18 |
| X3LV[4] | 0.15 | 0.15 | 0.15 | 0.15 |
| butyl oleate | — | 1.0 | — | 1.0 |
| TDI (TD80) | 66.5 | 66.5 | 66.5 | 66.5 |
| Index | 117 | 117 | 117 | 117 |
| Foaming Pressure (bar) | 1.0 | 1.0 | 0.7 | 0.7 |
| Density (lbs/ft$^3$) | 1.28 | 1.30 | 0.86 | 0.92 |
| Permeability (1"), (ft$^3$/ft$^2$/min) | 94 | 242 | 5 | 121 |
| Ball Rebound (%) | 22 | 32 | 14 | 33 |

[1]L620 is a silicone surfactant offered by OSi
[2]C2 is a tin catalyst offered by Air Products.
[3]R8020 is an amine catalyst offered by Air Products.
[4]X3LV is a blue dye offered by Milliken.

Examples C1 and C2 are comparative examples in which no butyl oleate was added to the foam-forming compositions. As shown in Table 1 (comparing examples C1 and C2 with examples 1 and 2), when the identical foam-forming compositions included butyl oleate, the resulting foam polymers had air permeabilities surprisingly higher, although density remained consistent.

The invention has been illustrated by detailed description and examples of the preferred embodiments. Various changes in form and detail will be within the skill of persons skilled in the art. Therefore, the invention must be measured by the claims and not by the description of the examples of the preferred embodiments.

We claim:

1. A method for producing a breathable, flexible polyurethane foam, comprising the steps of:
   (1) preparing a foam-forming composition from (a) a polyol selected from the group consisting of polyether polyols and mixtures of polyether polyols with polymer polyols, and (b) from about 40 to 70 parts by weight, based upon 100 parts by weight polyol, of a polyisocyanate, (c) a blowing agent; and (d) from about 0.5 to 2.0 parts by weight, based upon 100 parts by weight polyol, of butyl oleate; and
   (2) forming the polyurethane foam from the foam-forming composition under controlled pressure conditions maintained at or below atmospheric pressure.

2. The method for producing a breathable, flexible polyurethane foam of claim 1, wherein the foam-forming composition contains from about 1.0 to 1.5 parts butyl oleate.

3. The method for producing a breathable, flexible polyurethane foam of claim 2, wherein the foam is formed under a controlled pressure of about 0.7 bar.

4. The method for producing a breathable, flexible polyurethane foam of claim 1, wherein the isocyanate index is from about 100 to 120.

5. The method for producing a breathable, flexible polyurethane foam of claim 1, wherein the foam-forming composition contains one or more additives, selected from the group consisting of: fire retardants, melamine, surfactants, catalysts, colorants, pigments, deodorants and antimicrobial compounds.

6. The method for producing a breathable, flexible polyurethane foam of claim 1, wherein the foam has an air permeability greater than about 100 ft$^3$/ft$^2$/min.

7. A breathable, flexible polyurethane foam produced according to the method of claim 1.

8. The breathable, flexible polyurethane foam of claim 7, wherein said foam after curing has an air permeability greater than about 100 ft$^3$/ft$^2$/min.

9. A composition for producing a breathable, flexible polyurethane foam when foamed at controlled pressures maintained at or below atmospheric pressure, comprising:

a polyol selected from the group consisting of polyether polyols and mixtures of polyether polyols with polymer polyols;

from about 40 to 70 parts by weight, based upon 100 parts by weight polyol, of a polyisocyanate or mixture of polyisocyanates;

from about 2 to 6 parts by weight, based upon 100 parts by weight polyol, of a blowing agent; and from about 0.5 to 2.0 parts by weight based upon 100 parts by weight polyol, of butyl oleate.

10. The composition of claim 9, wherein the butyl oleate is present in an amount from about 1.0 to 1.5 parts by weight.

11. The composition of claim 9, wherein the isocyanate index is between about 100 and 120.

12. The composition of claim 9, further comprising one or more additives selected from the group consisting of: fire retardants, melamine, surfactants, catalysts, colorants, pigments, extenders, stabilizers, deodorants and antimicrobial compounds.

* * * * *

UNITED STATES PATENT AND TRADEMARK OFFICE
CERTIFICATE OF CORRECTION

PATENT NO. : 5,686,501
DATED : April 19, 1997
INVENTOR(S) : Rocco P. Triolo

It is certified that error appears in the above-identified patent and that said Letters Patent is hereby corrected as shown below:

Claim 1, at Column 6, line 7, "at or below atmospheric pressure" should read -- in the range of about 0.5 to about 0.9 bar --.

Claim 3, at Column 6, line 13, "claim 2" should read -- Claim 1 --.

Claim 9, at Column 6, line 34, "at or below atmospheric pressure" should read --in the range of between about 0.5 and about 0.9 bar."

Signed and Sealed this

Thirty-first Day of March, 1998

Attest:

BRUCE LEHMAN

*Attesting Officer*     Commissioner of Patents and Trademarks